United States Patent
Lohaus et al.

(10) Patent No.: US 6,782,985 B2
(45) Date of Patent: Aug. 31, 2004

(54) FRICTION CLUTCH, ESPECIALLY A MULTI-DISK CLUTCH

(75) Inventors: Norbert Lohaus, Schweinfurt (DE); Reinhold Weidinger, Unterspiesheim (DE); Frank Hirschmann, Niederwerrn (DE); Klaus Steinel, Bergrheinfeld (DE); Erwin Ziegler, Gressthal (DE); Wolfram Hick, Schwanfeld (DE); Joachim Linder, Dittelbrunn (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/261,221

(22) Filed: Sep. 30, 2002

(65) Prior Publication Data

US 2003/0062236 A1 Apr. 3, 2003

(30) Foreign Application Priority Data

Oct. 1, 2001 (DE) .......................................... 101 48 435

(51) Int. Cl.$^7$ .............................................. F16D 13/64
(52) U.S. Cl. .................................. 192/70.17; 192/214.1
(58) Field of Search ............................... 192/70.17, 212, 192/213, 213.11, 213.12, 213.3, 213.31, 214, 214.1; 464/68

(56) References Cited

U.S. PATENT DOCUMENTS

| 3,428,155 | A | * | 2/1969 | Binder et al. ............. | 192/214.1 |
| 4,122,931 | A | * | 10/1978 | Maucher ................. | 192/213.31 |
| 4,270,644 | A | * | 6/1981 | Billet .......................... | 464/68 |
| 4,475,640 | A | * | 10/1984 | Takeuchi et al. .......... | 192/70.17 |
| 4,741,423 | A | * | 5/1988 | Hayen .................... | 192/213.31 |
| 5,355,984 | A | * | 10/1994 | Grabis ...................... | 192/70.17 |
| 5,511,640 | A | * | 4/1996 | Fukunaga ................. | 192/214.1 |
| 5,593,015 | A | * | 1/1997 | Kosumi et al. ........... | 192/70.27 |
| 5,908,100 | A | | 6/1999 | Szadkowski et al. ..... | 192/214.1 |
| 5,979,629 | A | * | 11/1999 | Asada et al. ............. | 192/70.25 |
| 6,095,308 | A | * | 8/2000 | Knoblach et al. ........ | 192/213.12 |
| 6,520,306 | B2 | * | 2/2003 | Bertrand et al. ......... | 192/213.12 |
| 6,523,662 | B1 | * | 2/2003 | Orlamunder ............... | 192/70.2 |

* cited by examiner

Primary Examiner—Rodney H. Bonck
(74) Attorney, Agent, or Firm—Cohen, Pontani, Lieberman & Pavane

(57) ABSTRACT

Each clutch disk has a hub area designed to be connected nonrotatably to a power takeoff element and a friction surface area designed to be clamped between opposing friction surfaces. Each clutch disk has a torsional vibration damper arrangement including two cover disk elements connected to the hub area for rotation in common, and a central disk element connected to the friction surface area for rotation in common. The central disk element is or can be brought into torque-transmitting connection with the cover disk elements via a damper element arrangement. The central disk element has a damper element interaction area and, radially outside the damper element interaction area, a friction surface carrier area, which is offset with respect to the damper element interaction area in the direction of an axis of rotation.

12 Claims, 3 Drawing Sheets

FRICTION CLUTCH, ESPECIALLY A MULTI-DISK CLUTCH

BACKGROUND OF THE INVENTION

1. Field of the Invention

The present invention pertains to a friction clutch, especially to a multi-disk clutch or to a clutch disk for a friction clutch of this type.

2. Description of the Related Art

U.S. Pat. No. 5,908,100 describes a clutch disk which can be used in a multi-disk clutch. The clutch disk has an essentially flat central disk element, in the radially outer area of which radially outward-projecting friction lining carrier sections are formed as integral parts. Cover disk elements, which are or can be brought by a plurality of damper springs into torque-transmitting connection with the central disk element, are provided on both sides of the central disk element. The cover disk elements are rigidly connected radially on the inside to a hub area or carry this hub area as an integral part of themselves and thus, by a nonrotatable connection to a power takeoff element such as the input shaft to a transmission, transmit the torque which is to be transmitted by a clutch disk of this type.

A problem with clutch disks of this type is that, when they are to be integrated into a friction clutch, the space available for their installation is comparatively small. This problem becomes even more acute when the clutch is a multi-disk clutch, in which several of these types of clutch disks are arranged in a row. To accommodate these design conditions, it is known, for example, that, for at least one of the clutch disks, the friction surfaces or the friction linings carrying these friction surfaces can be provided not on the central disk element but rather on a cover disk element, so that an axial offset is present with respect to the central disk element or to the area in which the central disk element interacts with the damper elements. This means, however, that it is not the cover disk elements but rather the central disk element which must be connected to a hub area or must have a hub area of this kind. A design of this type could lead to the use of clutch disks of completely different design in one and the same friction clutch.

SUMMARY OF THE INVENTION

It is the object of the present invention to provide a friction clutch or a clutch disk for a friction clutch which makes it easy to adapt the design to various conditions within the friction clutch.

According to a first aspect, this task is accomplished by a friction clutch, especially by a multi-disk clutch, comprising at least one clutch disk, which is designed with a hub area which can be connected nonrotatably to a power takeoff element and with a friction surface area which can be clamped between opposing friction surfaces. The at least one clutch disk has a torsional vibration damper arrangement comprising two cover disk elements connected to the hub area for rotation in common and a central disk element connected to the friction surface area for rotation in common, which central disk element is in or can be brought into torque-transmitting connection with the cover disk elements by way of a damper element arrangement. The central disk element has a damper element interaction area and, radially outside the damper element interaction area, a friction surface carrier area, which is offset in the direction of an axis of rotation with respect to the damper element interaction area.

By providing an axial offset between the area of the central disk element which cooperates with the damper element arrangement and the area on which the central disk element carries or is connected to friction surfaces or friction linings, it guaranteed that the design can be adapted to various conditions in the friction clutch, and it is equally ensured that the forces are introduced into the center of the torsional vibration damper arrangement via the central disk element.

It can be provided, for example, that the central disk element has an essentially cylindrical section radially outside the damper element interaction area, on which section the friction surface carrier area is provided. By providing a cylindrical section, it becomes easy to adjust the length of the central disk element in the area where it carries the friction surface carrier, and thus an even better adaptability to various design conditions is afforded. For strength reasons, it is preferable for the cylindrical section to extend continuously around the axis of rotation in the circumferential direction. Of course, it is also possible to design the essentially cylindrical section with interruptions in the circumferential direction by providing several axially projecting sections.

It is also possible in the friction clutch according to the invention for the cylindrical section to be designed as an integral part of the damper element interaction area. For example, the central disk element can be shaped from a stock blank, preferably of sheet or plate.

To attach the friction lining carrier to the central disk element, it is possible in a design variant for the cylindrical section to have an outer circumferential connecting surface for the attachment of at least one friction lining carrier, preferably by welding, to the central disk element. So that it is possible here to provide a very precisely machined surface for the attachment of the friction lining carrier, it is proposed that the outer circumferential connecting surface be formed by machining down at least certain areas of the cylindrical section.

For the friction clutch according to the invention, the machining work can be minimized by providing the outer circumferential connecting surface of the cylindrical section only in the axial area where the friction lining carrier is to be connected to it.

As an alternative, however, it is also possible for the outer circumferential connecting surface to be provided over essentially the entire axial length of the cylindrical section. This design variant makes it possible, when adapting the disk to various basic designs of a friction clutch, for the friction lining carrier to be provided in any desired position in the axial direction on the cylindrical section. This is especially advantageous in cases where the friction clutch is a multi-disk clutch, because then the torsional vibration damper arrangements used for the various clutch disks can be essentially identical.

In an alternative design, it is also possible for the cylindrical section to have a connecting end surface for the attachment, preferably by welding, of at least one friction lining carrier to the central disk element.

As already explained, the friction clutch according to the invention can have at least two clutch disks; that is, it can be designed as a multi-disk clutch.

In such cases, it is then advantageous for the friction surface carrier areas for at least two of the clutch disks to have different offsets in the direction of the axis of rotation with respect to the associated damper element interaction areas. Especially when use is made of the previously mentioned identical torsional vibration damper arrangements for each of the various clutch disks, it is advantageous for the friction surface carrier area for at least one clutch disk to be a certain axial distance away from the axial end of the cylindrical section of the associated central disk element. In this way, different clutch disks can be provided with different axial offsets.

Because of the possibility of adapting the friction clutch according to the invention to various sets of design conditions through the variability of the axial positioning of the friction lining carrier on the central disk element or on the cylindrical section of that element, it is possible, in the case of at least two clutch disks, to use the same shaping tool to produce the central disk elements from the stock blanks. This, too, decreases the cost of production and especially the inventory costs.

According to another aspect of the invention, the task cited above is accomplished by a clutch disk which can be used in a previously described friction clutch. The hub area of this clutch disk is designed for nonrotatable connection to a power takeoff element, and the friction surface area of the disk can be clamped between two opposing friction surfaces. The clutch disk has a torsional vibration damper arrangement comprising two cover disk elements connected to the hub area for rotation in common and a central disk element connected to the friction surface area for rotation in common. The central disk element is or can be brought into torque-transmitting connecting with the cover disk elements by way of a damper element arrangement, and has a damper element interaction area. Radially outside the damper element interaction area is a friction surface carrier area, which is offset with respect to the damper element interaction area in the direction of an axis of rotation.

Of course, this clutch disk can be designed with the features specific to clutch disks described above.

The present invention is described in detail below with reference to the attached drawings, which illustrate preferred embodiments.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
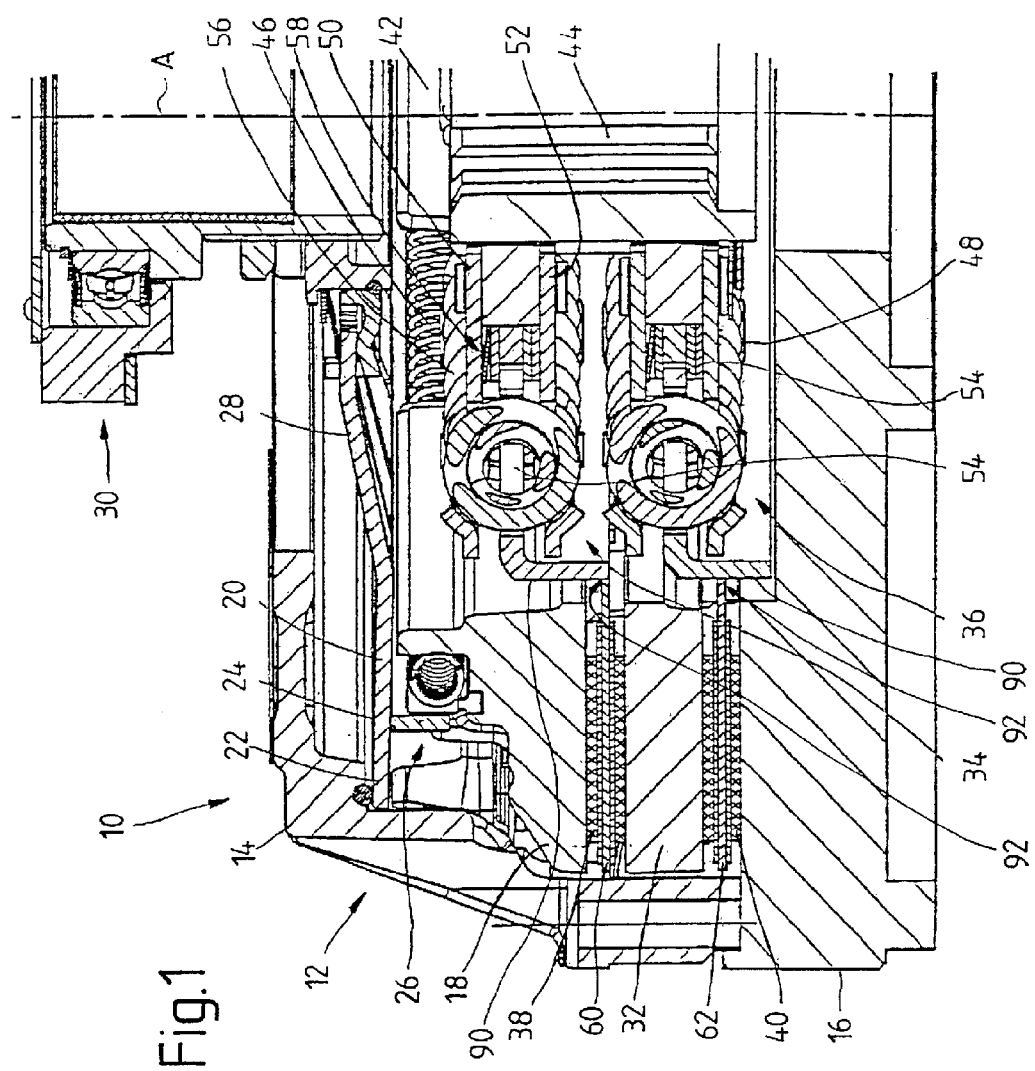
FIG. 1 shows a partial longitudinal section through a multi-disk friction clutch according to the invention.

The essential principles of the design and function of a friction clutch in which the present invention can be realized are described in the following with reference to FIGS. 1–4.

The friction clutch 10 comprises a pressure plate assembly 12 with a housing 14, the radially outer area of which is or can be connected to a flywheel 16. The flywheel 16 can be designed as single mass, but it can also obviously be designed as a multi-mass flywheel. In the radially inner area, the flywheel 16 is designed so that it can be connected nonrotatably to a drive shaft, such as to the crankshaft of an internal combustion engine.

The pressure plate assembly 12 also includes a pressure plate 18, which is connected in an essentially nonrotatable manner by, for example, a plurality of tangential leaf springs or the like, to the housing 14, but is able to shift position with respect to the housing 14 within a limited axial range in the direction of an axis of rotation A. The radially outer area 22 of a stored-energy device 20, which can be designed, for example, as a diaphragm spring, is supported on the housing 14, whereas the area 24 farther inward in the radial direction acts on the pressure plate 18 by way of a wear-compensating device 26, to be described in greater detail further below. A release mechanism 30 for executing disengaging processes of the pull type acts on the spring tongues 28 located radially on the inside.

The pressure plate assembly 12 also includes an intermediate plate 32, which is also connected to the housing 14 with freedom to move within a certain axial range but without any freedom to rotate relative to the housing.

The pressure plate assembly 12, i.e., the friction clutch 10, comprises in addition two clutch disks 34 and 36. Each of these clutch disks has a friction lining 38, 40 in the radially outer area, and in the radially inner area they have a hub 42, the wedge-like teeth 44 or the like of which can be positioned nonrotatably on a power takeoff shaft, such as the input shaft to a transmission.

Each of the two clutch disks 34, 36 also has a torsional vibration damping arrangement 46, 48. The two torsional vibration damping arrangements 46, 48 are both designed in the same way in the example presented here. Each include, as will be described below on the basis of the clutch disk 34, two cover disk elements 50, 52, which are connected in the radially inner area to the hub 42 for rotation in common, either directly or via an additional predamper stage. Here, for example, the two cover disk elements 50, 52 can have sets of internal teeth which mesh with corresponding external teeth on the hub 42. Axially between the two cover disk elements 50, 52 is a central disk element 54. Both the cover disk elements 50, 52 and the central disk element 54 have spring windows with control edges in the circumferential direction, on each of which the end of damper spring 56 is supported in the circumferential direction. Several damper springs 56 in a row in the circumferential direction or groups of damper springs 56, nested radially inside each other, for example, can be provided as generally known in and of itself for torsional vibration damper arrangements normally provided for clutch disks. Because of the presence of the damper springs 56, a limited circumferential mobility of the central disk element 54 with respect to the associated cover disk elements 50, 52 is made possible. Here, in a manner known in and of itself, a stop for limiting rotational movement can be provided to prevent the damper springs 56 from being "set on block". In addition, a dry friction device 58 can be provided to contribute by Coulomb friction, to the vibration damping above and beyond the damping effect provided by compression of the springs. As already explained, it is obviously possible to design the torsional vibration damping arrangements 46, 48 with several stages, such as through the provision of an additional set of cover disk elements axially farther toward the outside and an associated set of springs, which can then act between the cover disk elements 50, 52 and these additional cover disk elements.

The central disk elements 54 of the two clutch disks 34, 36 carry in their radially outer area disk-like friction lining carriers 60, 62, which again carry the friction linings 38, 40 via associated leaf springs or the like or can themselves be the elastic mounts for the linings.

In the engaged state, the stored-energy device 20 presses down via the previously mentioned wear-compensating device 26 on the pressure plate 18. This presses the friction linings 38 of the clutch disk 34 against the intermediate plate 32. The clutch disk 36 with its friction linings 40 can then be clamped between the intermediate plate 32 and the flywheel 16. As a result of this friction-locking connection, therefore, a nonrotatable connection is established between the pressure plate 18, the intermediate plate 32, and the flywheel 16 on the one side and the two clutch disks 34, 36 or the common hub 42 of the disks on the other. For the transition to the disengaged state, a pulling force is exerted on the spring tongues 28 of the stored-energy device 20. This moves area 24 of the device axially away from the flywheel 16, and the device thus releases at least some of the force it is exerting on the pressure plate 18. Under the action of the previously mentioned tangential leaf springs or the like, the pressure plate 18 and the intermediate plate 32 are then also moved away axially away from the flywheel 16, so that, by the release of the clamping action, the two clutch disks 34, 36 are also released.

Figure 2:
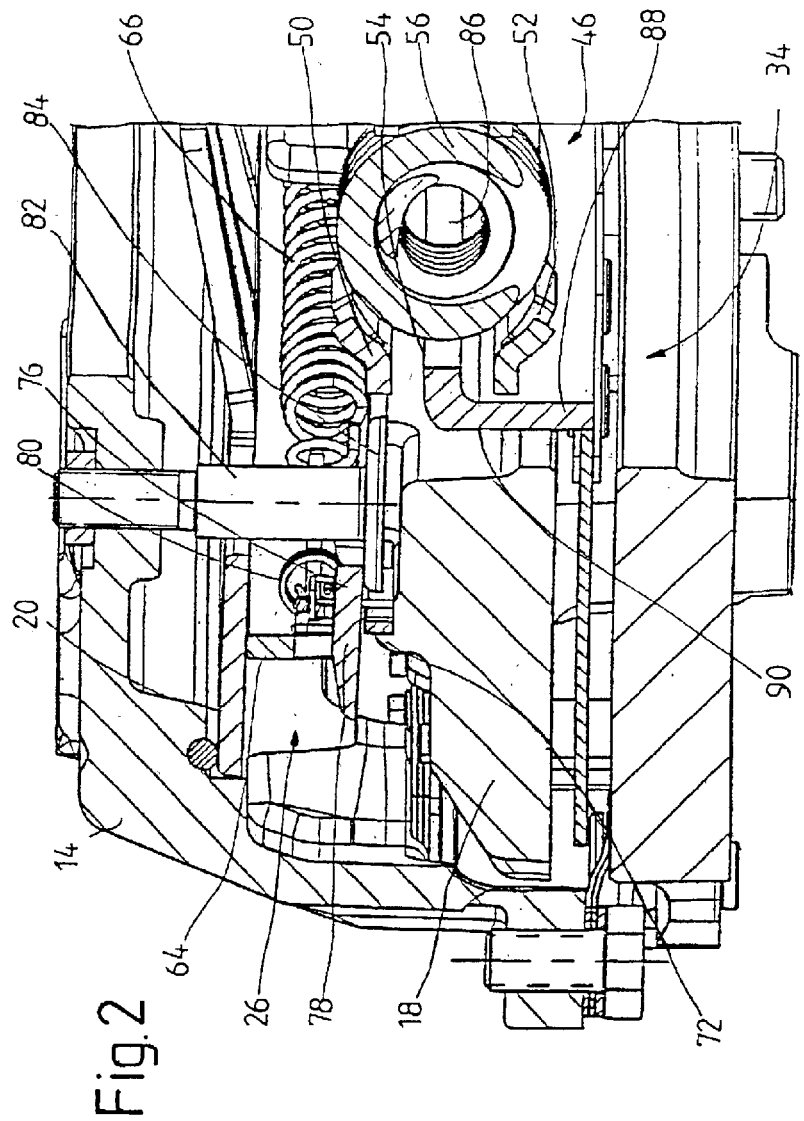
FIG. 2 shows a partial longitudinal section through the pressure plate assembly of the clutch shown in FIG. 1.
Figure 3:
FIG. 3 shows a side view of a wedge-like slider element of the clutch according to the invention.

In the following, the design and function of the wear-compensating device 26 is described with reference to FIGS. 2–4.

The wear-compensating device 26 comprises an adjusting 64 ring, one axial side of which is acted on by the stored-energy device 20. The other axial side of the adjusting ring 64 has several ramp or wedge surfaces arranged in a row in the circumferential direction; the height of these ramps changes in the circumferential direction. Axially opposite these surfaces are corresponding surfaces of the pressure plate 18. A rotation of the adjusting ring 64 has the result that the surface of the ring acted on by the stored-energy device 20 changes its axial level with respect to the pressure plate 18. As a result of the pretensioning spring 66, which can be designed as a helical tension spring, for example, the adjusting ring 64 is preloaded for rotational movement around the axis of rotation A with respect to the pressure plate 18 in the direction such that, upon release of the adjusting ring 64, the ring is pushed in the axial direction so that the surface of the ring actuated by the stored-energy device 20 moves away from the pressure plate 18. For this purpose, the pretensioning spring 66 is held in place at one end on the pressure plate 18 and at the other end on the adjusting ring 64.

The wear-compensating device 26 also includes a wedge-like, curved slider 68, the curvature of which conforms to the curved contour of the adjusting ring 64; a longitudinal section 70 of the slider rests against an inner circumferential area of an axial shoulder 72 on the pressure plate 18. The slider 68 is designed basically for sliding in the circumferential direction. One end of a leaf-like arresting element 76 is fixed in place at one end on the pressure plate 18; the other circumferential end 78 of the arresting element extends over the wedge-like elongated area 70 of the wedge-like slider 68. As a result of the leaf spring-like design, the arresting element 76 presses on the slider 68 and thus pushes it against the pressure plate 18. One end of another pretensioning spring 80 is hooked onto a hook section 78 of the slider 68, whereas the other end is hooked onto the end of spring 66 by which spring 66 is hooked onto the adjusting ring 64. As a result of the pretensioning spring 80, the slider 68 is induced to slide in one circumferential direction, this being the direction in which the increasingly larger axial dimension of the slider tries to fill up the area between the pressure plate 18 and the end area 78 of the arresting element 76. The arresting element 76, however, the end area 78 of which is pretensioned against the pressure plate 18, basically prevents the slider 68 from executing this type of sliding movement in the circumferential direction.

Figure 4:
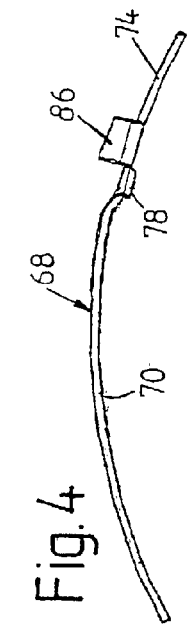
FIG. 4 shows a top view of the slider element of FIG. 3.

It can be seen especially clearly in FIG. 4 that the slider 70 has a blocking section 86, which is bent outward in the radial direction. This blocking section 86 extends radially outward to engage in an associated circumferential opening in the adjusting ring 64; this circumferential opening, which cannot be seen in the figures, has a larger circumferential dimension than the blocking section 86. This therefore means that the blocking section 86 has a certain limited freedom to move circumferentially in this circumferential opening of the adjusting ring 64.

There is a stop element 82 on the housing 14, also radially inside the adjusting ring 64 and near the end area 78 of the arresting element 76. This stop can be designed as a threaded bolt, which is screwed into a corresponding threaded hole in the housing 14, and which has a mushroom-like head. The head 84 grips under the arresting element 76, that is, it projects into the space formed between the arresting element 76 and the pressure plate 18.

In the following, the way in which the wear-compensating device 26 functions upon the occurrence of wear, that is, upon abrasion of the friction linings 38, 40, is described.

The friction linings 38, 40 are subjected to heavy stress, especially during the execution of clutch-engaging operations, so that abrasion occurs primarily under these conditions. Abrasion of the friction linings 38, 40 of the two clutch disks 34, 36, however, has the result that the intermediate plate 32 and the pressure plate 18 are moved closer to the flywheel 16. The stored-energy device 20 basically follows along after this movement by changing its installation position correspondingly when in the engaged state. Once the wear reaches a certain point, the end area 78 of the arresting element 76 arrives in contact with the stop element 82, i.e., with the mushroom-shaped head 84 of this element. As the amount of wear becomes even greater, the previously described displacement of the pressure plate 18 toward the flywheel 16 has the result that the end area 78 of the arresting element 76 remains hanging on the stop element 82, which means that this end area 78 can no longer follow along after the displacement of the pressure plate 18. The intermediate space formed between the arresting element 76 and the pressure plate 18, which space is filled up by the wedge-like section 70 of the slider 68, thus becomes larger. This enlargement allows the slider 68 to move slightly in the circumferential direction. The displacement of the slider 68 in the circumferential direction thus ultimately corresponds to the amount of wear. This displacement of the slider 68 in the circumferential direction is possible in particular because the blocking section 86 has a certain circumferential play in the previously mentioned opening in the adjusting ring 64. Upon the occurrence of wear, therefore, first only a certain part of the arresting element 76 will be able to move axially with respect to the pressure plate 18, and in correspondence with that, the slider 68 will also move to a certain extent in the circumferential direction. The pretensioning spring 80 thus relaxes slightly. Because, in the engaged state, the adjusting ring 64 is acted on by the diaphragm spring, i.e., by the stored-energy device 20, this ring will not at first be able to rotate circumferentially with respect to the pressure plate 18. Only upon the performance of a release operation, that is, after the diaphragm spring 20 releases its comparatively strong force as a result of the above-mentioned pulling action and the contact force of the adjusting ring 64 on the stored-energy device 20 is defined essentially only by the previously mentioned tangential leaf springs, which also provide the release force, the adjusting ring 64 can, under the preloading effect of the pretensioning spring 66, move slightly in the circumferential direction until one of the circumferential ends of the opening in it makes contact with the blocking section 86. Because the circumferential movement of the slider 68 already corresponds with the wear which has occurred, the rotational movement of the adjusting ring 64, which becomes possible upon execution of a release operation, also corresponds to the wear which has occurred. Upon this rotational movement, the pretensioning spring 66 relaxes slightly, but simultaneously the pretensioning spring 80 is tensioned again somewhat more strongly. The result of this is that the pretensioning force applied by the spring 66 must be greater than the pretensioning force applied by the spring 80.

As a result of the rotation of the adjusting ring 64, which, upon occurrence of wear, becomes possible in the disengaged state, this ring will, as already mentioned, become displaced axially with respect to the pressure plate 18. The entire assembly clamped axially between the stored-energy device 20 and the flywheel 16, comprising the adjusting ring 64, the pressure plate 18, the clutch disk 34 in the area of its friction linings 38, the intermediate plate 32, and the clutch disk 36 in the area of its friction linings 40, thus retains an approximately constant axial dimension regardless of the amount of wear which has occurred. As a result, the stored-energy device 20 also retains approximately the same installed position. It should be pointed out here that, depending on the degree of inclination of the elongated, wedge-like area 70 of the slider 68, for example, the degree of compensation can be increased or decreased. It should also be pointed out that several of these sliders 68 and their associated arresting elements 76 or stop elements 82 can obviously be distributed around the circumference, although, to implement the previously described wear compensation, a single such slider is sufficient.

As explained above, each of the two clutch disks 34, 36 has a torsional vibration damper arrangement 46, 48. As can be seen especially clearly in FIG. 1, these are basically identical in design. An essential design prerequisite for clutch disks which have these types of torsional vibration damper arrangements is the availability of sufficient space in this type of friction clutch 10. It can be seen especially in FIG. 1 that the clutch disks 34, 36 are comparatively close together in the area of their friction linings 38, 40, which would in principle make it difficult to provide the torsional vibration damper arrangements 46, 48. According to the present invention, therefore, it is provided that, between the friction linings 38, 40 and their associated torsional vibration damper arrangements 46, 48 there is a certain axial offset, which is adapted to the axial height of the torsional vibration damper arrangements 46, 48. To make such an axial offset possible, the two central disk elements 54 are designed in such a way that they have a damper element interaction area 86 radially on the inside for cooperating with the damper springs 56, this area being designed approximately in the shape of a disk provided with spring windows and control edges. A section 88 with, for example, a cylindrical shape, adjoins these areas radially outside the damper springs 56. A disk-like blank of sheet or plate, for example, can be made into the cup-like shape shown in the figures in the course of a shaping process.

To attach the friction lining carrier 60, 62, a very precisely formed cylindrical outer circumferential surface 90 must be provided. This can, for example, be obtained by the machining of a central disk element 54. The inner circumferential surface of the friction lining carrier 60, 62 is then placed on this outer circumferential surface 90 and attached to it by welding. Depending on the amount of axial installation space available, the two friction lining carriers 60, 62 can be attached to different axial areas, i.e. to the friction lining carrier areas 92 of the outer circumferential surface 90 provided for this purpose. It can be seen that, in the case of the clutch disk 34 closer to the pressure plate 18, the friction lining carrier 60 is provided close to the axial end of the section 88. This means that the friction lining carrier area 92 is near the axial end of the outer circumferential surface 90. In the case of the clutch disk 36, the friction lining carrier area 92 is farther away axially from the end of the section 88, being located approximately in the center of the axial dimension of this section. Here, therefore, even though the central disk elements 54 are identical in design, it is easy to adapt the design and to obtain a clutch disk or an essential part of such a disk which fits the space available in the actual case by assembling the torsional vibration damper arrangement and the friction lining carrier in a suitable manner.

It would also be possible to adapt the axial length of the axial section 88 to the design requirements as well; for example, it would be possible for the clutch disk 36 to have a shorter section 88. It has been found, however, that, for the sake of strength, it can be advantageous to leave alone the extra length visible in FIG. 1. This is also a preferred approach for production reasons, because there is then no need to produce different components and no need for an additional machining step to cut off part of the cylindrical section.

Figure 5:
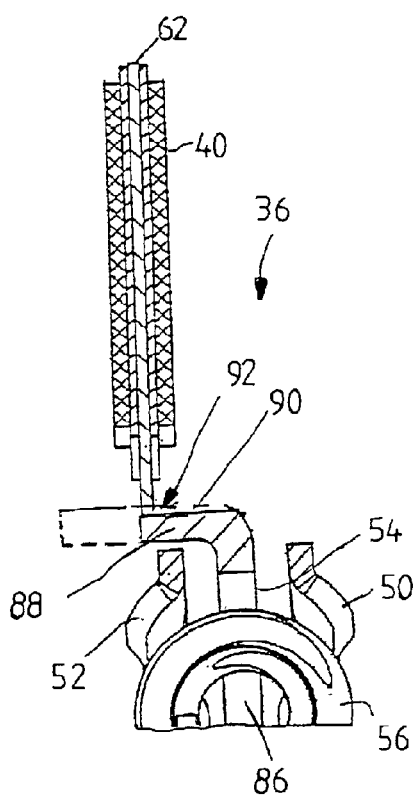
FIGS. 5 and 6 show views of clutch disks which can be used in the friction clutch shown in FIG. 1.
Figure 6:
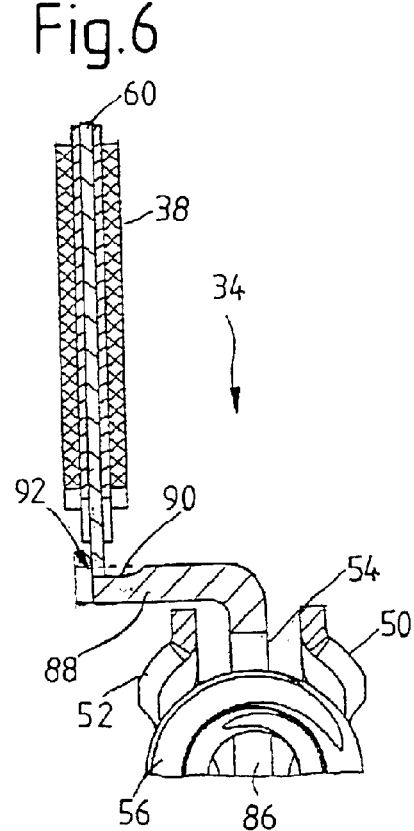

FIGS. 5 and 6 show an alternative embodiment of the radially outer area of the two clutch disks 34, 36. It can be seen here that the two central disk elements 54 have been machined to adapt them to actual design requirements. Starting from a blank with the contour of the cylindrical section 88 shown in broken line, a longer length of the cylindrical section 88 has been cut off for the clutch disk 36, for example, than for the clutch disk 34. Next, to provide the outer circumferential surfaces 90, the radially outer areas of the two cylindrical sections 88, i.e., of the cover disk elements 54, are machined or turned down; here, as can be seen in FIG. 6, machining of this type is performed, for example, only where the friction surface carrier area 92 is actually to be attached. This increases the overall strength of the cover disk elements 54 and reduces the amount of machining work required. In this embodiment, too, the two friction lining carriers 62 can then be attached radially from the outside to the friction surface carrier areas 92 by welding, for example. Basically, however, it should be remarked that, in this embodiment, too, it is possible to work with the same original blank, that is, with an essentially flat disk of sheet or plate, which is then brought into a cup-like shape and subjected to further processing as requirements demand.

Figure 7:
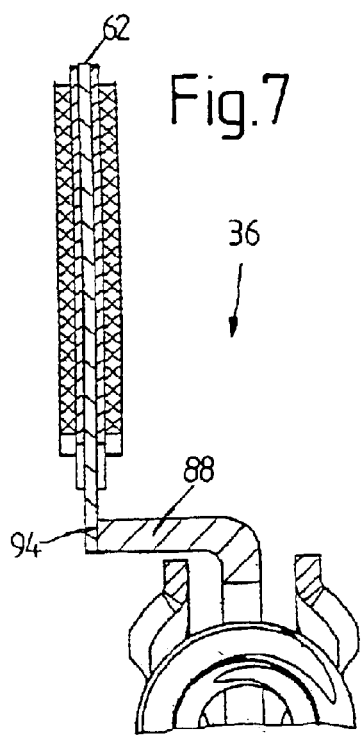
FIGS. 7 and 8 show views of clutch disks which can be used in the friction clutch shown in FIG. 1.
Figure 8:
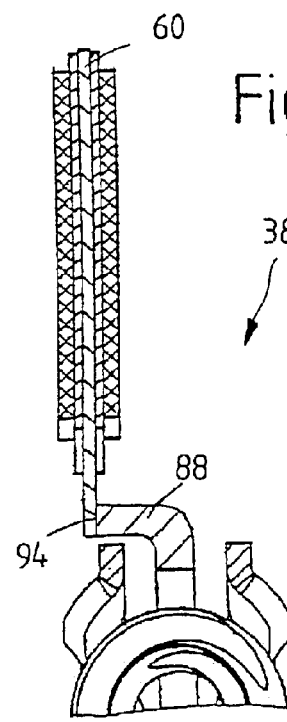

FIGS. 7 and 8 show another design variant of the two clutch disks 36, 38. It can be seen here that the friction lining carriers 60, 62 are not attached to an outer circumferential surface 90 (FIG. 2) produced by machining as in the case previously described but rather to an associated axial end surface 94 of the essentially cylindrical section 88 and fastened there by, for example, welding, laser-beam welding, etc.

In this design variant, the machining work can be further reduced because there is no need in principle to machine the outer circumferential surface at all. The process of shortening the cylindrical section 88 to the necessary extent is itself enough to provide an end surface 94 which allows the immediate attachment of the friction lining carrier 60, 62 by welding. Whereas this design offers advantages over, for example, the design shown in FIGS. 5 and 6 with respect to the process of producing the individual central disk elements 54 by simplifying the machining, more time is required to assemble the friction lining carriers 60, 62 with the central disk elements 54. In the case of the previous design variant described above, furthermore, centering is ensured simply by the outer circumferential surface 90, which has been prepared with great precision.

All of the embodiments described above provide the advantage that, because of the required machining of the surfaces of the central disk elements 54 on which the friction lining carriers 60, 62 are to be attached, no problems are caused by the fact that, to obtain the required strength, the central disk elements 54 are first hardened after the shaping step, it being difficult to produce welds to hardened surfaces of the required strength.

As a result of the present invention, a friction clutch or a clutch disk for a friction clutch of this type is provided, in which, because of the right-angle bend in the axial direction of a central disk element of a torsional vibration damper arrangement of the clutch disk or disks, it is easy to adapt the axial position of the friction linings with respect to the torsional vibration damper area. Because provisions are also made for attachment to the central disk element, it is ensured that the forces are introduced in an axially centered manner into the torsional vibration damper arrangements. It should also be pointed out here again that the area of the torsional vibration damper arrangements of the clutch disks can obviously be designed in a wide variety of ways. For example, multi-stage dampers, possibly with additional no-load dampers, can be provided. In addition, several sets of springs can follow each other in the circumferential direction, and the springs can even be nested radially inside each other.

It should be pointed out that the clutch disks described above can obviously be used not only in conjunction with multi-disk clutches. The design according to the invention can also be used in single-disk clutches, in which the axial offset of the friction linings with respect to the torsional vibration damper arrangement shown in the figures is advantageous.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A friction clutch comprising a hub for connecting to a power takeoff element and at least two clutch disks arranged coaxially, each said clutch disk comprising a pair of cover disk elements connected to said hub for rotation in common with said hub about an axis of rotation, a central disk element having a damper element interaction area and a friction lining carrier area, said friction lining carrier area being radially outside of said damper element interaction area and axially offset from said damper element interaction area, a damper element arrangement arranged in said damper element interaction area to transmit torque between said cover disk elements and said central disk element, and a pair of axially opposed friction linings for clamping between opposed friction surfaces, said friction linings being fixed to said friction lining carrier area, wherein said friction lining carrier areas of respective said clutch disks have different axial offsets from the respective damper element interaction areas.

2. A friction clutch as in claim 1 wherein said central disk element further comprises a cylindrical section radially outside of said damper element interaction area, said friction lining carrier area being provided on said cylindrical section.

3. A friction clutch as in claim 2 wherein said cylindrical section is circumferentially continuous about said axis of rotation.

4. A friction clutch as in claim 2 wherein said cylindrical section is integral with said damper element interaction area.

5. A friction clutch as in claim 4 wherein said central disk is stamped and formed from plate stock.

6. A friction clutch as claim 2 further comprising a friction lining carrier on which said friction linings are fixed, said cylindrical section having an outside circumferential connecting surface to which said friction lining carrier is connected.

7. A friction clutch as in claim 6 wherein said outside circumferential connecting surface is machined on said cylindrical section.

8. A friction clutch as in claim 6 wherein said outside circumferential connecting surface is provided only where said friction lining carrier is connected.

9. A friction clutch as in claim 6 wherein said outside circumferential connecting surface is provided over essentially the entire axial length of said cylindrical section.

10. A friction clutch as in claim 2 further comprising a friction lining carrier on which said friction linings are fixed, said cylindrical section having a connecting end surface to which said friction lining carrier is connected.

11. A friction clutch as in claim 1 wherein each said central disk element further comprises a cylindrical section radially outside of said damper element interaction area, said friction lining carrier area of at least one of said central disks being axially spaced from one axial end of the cylindrical section.

12. A friction clutch as in claim 1 wherein said central disk elements are stamped and formed using the same forming dies.

\* \* \* \* \*